(12) United States Patent
Choiniere et al.

(10) Patent No.: US 7,577,101 B1
(45) Date of Patent: Aug. 18, 2009

(54) METHOD AND APPARATUS FOR GENERATING EXTENSIBLE PROTOCOL INDEPENDENT BINARY HEALTH CHECKS

(75) Inventors: David A. Choiniere, Attleborough, MA (US); Timothy J. Knight, Shrewsbury, MA (US); Darren J. Hayduk, Wilmington, MA (US); Venu G. Moogala, Marlborough, MA (US); Mark E. Pawela, Hopkinton, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 869 days.

(21) Appl. No.: 10/835,795

(22) Filed: Apr. 30, 2004

(51) Int. Cl.
*H04L 12/28* (2006.01)
*G06F 15/16* (2006.01)
*G06F 11/00* (2006.01)

(52) U.S. Cl. .................. 370/252; 370/253; 370/352; 370/401; 370/465; 370/466; 709/224; 709/229; 714/47; 714/51

(58) Field of Classification Search ......... 370/350–352, 370/400–406, 465–466, 252–253; 709/224–229; 714/47–51
See application file for complete search history.

(56) References Cited

U.S. PATENT DOCUMENTS

| | | | | |
|---|---|---|---|---|
| 5,719,861 A * | 2/1998 | Okanoue | ............... | 370/351 |
| 6,597,956 B1 * | 7/2003 | Aziz et al. | .................. | 700/3 |
| 6,831,549 B2 * | 12/2004 | Foster et al. | ............ | 340/286.09 |
| 6,970,552 B1 * | 11/2005 | Hahn et al. | ............ | 379/265.02 |
| 7,016,360 B1 * | 3/2006 | Dong | ..................... | 370/401 |
| 7,124,305 B2 * | 10/2006 | Margolus et al. | ............ | 713/193 |
| 7,313,735 B1 * | 12/2007 | Levergood et al. | ............ | 714/47 |
| 7,360,121 B2 * | 4/2008 | Srivastava et al. | ............ | 714/47 |
| 7,360,122 B2 * | 4/2008 | Srivastava et al. | ............ | 714/47 |
| 2003/0212928 A1 * | 11/2003 | Srivastava et al. | ............ | 714/47 |
| 2004/0010586 A1 * | 1/2004 | Burton et al. | ............... | 709/224 |
| 2004/0010716 A1 * | 1/2004 | Childress et al. | ............ | 713/201 |
| 2004/0088355 A1 * | 5/2004 | Hagan et al. | ................ | 709/203 |
| 2004/0142683 A1 * | 7/2004 | Clark et al. | ................. | 455/418 |
| 2004/0153405 A1 * | 8/2004 | Millary et al. | ............... | 705/40 |
| 2004/0172470 A1 * | 9/2004 | Shiina | ....................... | 709/224 |
| 2006/0064481 A1 * | 3/2006 | Baron et al. | ................ | 709/224 |

* cited by examiner

*Primary Examiner*—Edan Orgad
*Assistant Examiner*—Venkatesh Haliyur
(74) *Attorney, Agent, or Firm*—Brooks Kushman P.C.

(57) ABSTRACT

A method and apparatus are provided for performing health check requests on one or more network devices or network resources. The method and apparatus provide a build tool for building a health check request having an extensible data format adaptable to a protocol supported by the network device or network resource of concern. The health check request can be built using data captured from a unit of network traffic on a transmission medium or with data provided via a user interface, or a combination of both. A health check request built using the method or apparatus can support any protocol including proprietary protocols avoiding the need for a requestor to learn a protocol format in order to build a health check request checking an operational characteristic of a network device or network resource. The method and apparatus allow this to be accomplished using data captured from a successful transaction.

11 Claims, 3 Drawing Sheets

METHOD AND APPARATUS FOR GENERATING EXTENSIBLE PROTOCOL INDEPENDENT BINARY HEALTH CHECKS

TECHNICAL FIELD OF THE INVENTION

This invention relates to communication networks, and more particularly, to monitoring the health of the devices forming the communications network.

BACKGROUND OF THE INVENTION

A common technique for monitoring the health of a network device is the generation and forwarding to the network device a health check request. A response from the network device to the health check request provides an indication as to the availability of a service, response time, or state of the network device.

Available "health check" applications provide a pre-determined set of health check requests for determining the availability of a resource of a network device. Although the available pre-determined sets of health check requests provide some user flexibility that allows a user to select the best individual health check request or set of health check requests, the predefined health checks do not support every environment or application. The available "health check" applications are often protocol specific and therefore limited in their application. As such, users having specific requirements beyond the capability of the pre-defined health check requests need to develop one or more health check requests in order to support a specific requirement.

The development of application specific or enterprise specific health check requests is burdensome, requiring an individual to have programming skills and knowledge of the protocol supported by the application or enterprise. Consequently, development of such specific health check requests is costly and time consuming due to the engineering development and possible functional testing of the health check requests required prior to actual deployment.

Accordingly, there exists a need for building or generating health check requests suitable for use with any protocol in any environment without the delay associated with engineering development, testing, and other undesirable burdens.

SUMMARY OF THE INVENTION

The present invention provides methods and an apparatus for building health check requests. The health check requests built in accordance with the present invention allow a user to specify what a request should look like, as well as the expected response from a network device. Such a health check request is considered a "raw" or "binary" health check request. Moreover, such a health check request provides a mechanism for a requestor to determine a state of a network device or an application operating on the network device without the need to have programming knowledge of a protocol understood by the remote resource. That is, data captured by a capture mechanism from a successful transaction with the network device is usable to build the health check request and an expected response. A suitable capture mechanism includes, but is not limited to a sniffer, a protocol analyzer, or other suitable mechanism. Accordingly, the methods and apparatus of the present invention allows a requestor to build a health check request and determine a state of a network resource specific to the user's environment. The apparatus and methods of the present invention avoid the need to rely on pre-defined health check requests to determine a state or a plurality of states of a network device. Furthermore, the present invention benefits a network device associated with a load balancing mechanism because the load balancing mechanism can load balance network traffic across multiple network devices, for example an array of servers based on a result of a health check request.

In one embodiment of the present invention, a network device is disclosed. The network device includes a health check mechanism. The health check mechanism includes an input to receive a request to build a health check request for a remote network device associated with the network device. The request can also include information concerning an expected response to the health check request from the remote network device. The network device can also include a load balancing mechanism. The load balancing mechanism includes an input to receive an output of the health check mechanism and in response to the output determine an amount of network traffic to direct towards the remote network device.

The network device further includes one or more input/output ports to receive and transmit the network traffic. The network device also includes an interface to receive the request to configure a health check request and can include a capture mechanism configured to capture a unit of network traffic from a transport medium or a port of the network device in response to a request from a user. In this manner, a user can request the capture mechanism to capture network traffic and use a portion of the captured network traffic to create a health check profile for use in building a health check request and an expected response. Nevertheless, the capture mechanism can be external to the network device and the user can request the capture mechanism to capture network traffic and use a portion of the captured network traffic to create a health check profile for use in building a health check request and an expected response.

The health check mechanism builds the health check request by including data in a hexadecimal format. The hexadecimal format represents the "raw" byte stream understood by the remote network device.

The health check mechanism can send the health check request towards the remote network device in either a connectionless communication protocol or in a connection-oriented protocol. Further, the health check mechanism in response to a request from a user can build a health check request using data captured by the capture mechanism.

Further, the health check mechanism of the network device can build the health check request to include a session ID, a transaction ID, or one or more symbols to indicate one or more bits in the response to the health check is a "don't care" bit or a "match any" bit. A health check request built by the health check mechanism provides a capability to verify a state transition of the remote network device. As such, upon receipt of the health check request an operational remote network device or a resource associated therewith transitions from a first state to a second state to indicate an operational capability.

In another embodiment of the present invention, a method performed in a network device is disclosed. Performance of the method determines a state of a network resource capable of communicating with the network device. The method includes steps of generating a health check request having a data format understandable by the network resource and determining a state of the network resource from a response to the health check request by the network resource. The method can further include a step of receiving a request from a user that defines the data format for the health check request and defines the data format for the expected response of the network resource.

Further, the method can include a step of forwarding the health check request towards the network resource and a step of determining a plurality of state transitions for the network resource in response to receipt of one or more health check requests. The method can further include a step of directing an amount of network traffic towards the network resource based on the state and/or the response time of the network resource.

In the method, the step of generating can include steps of capturing a unit of network traffic from a network medium associated with the network resource and transferring data from the captured unit of network traffic to a field of the health check request. The step of capturing a unit of network traffic can occur automatically or can occur in response to a request from a user.

In a further embodiment of the present invention, a network device readable medium encoded with a program that, when executed by a network device, performs a method for determining a state of a remote network device in communication with the network device. Execution of the program generates a health check request having a data format understandable by the remote network device. In this manner, a data format representing a data field format of a unit of network traffic supported by the remote network device can be sent to the network device. As such, the network device determines the state of the remote network device by comparing a response to the health check request by the remote network device to an expected response. The generation of the health check request can include steps of capturing, in response to a request from a requestor, the unit of network traffic from a network medium associated with the remote network device and transferring data from the unit of network traffic to a field of the health check request.

The method performed by execution of the program held by the network device readable medium can further include a step of receiving a first request defining the data format for the health check request and a step of receiving a second request defining the data format for the response of the remote network device to the health check request. A further step includable in the program forwards the health check request towards the remote network device. Further, performance of the method can determine a plurality of state transitions for the remote network device in response to receipt of the health check request.

BRIEF DESCRIPTION OF FIGURES

An illustrative embodiment of the present invention will be described below relative to the following drawings.

DETAILED DESCRIPTION

The illustrative embodiment of the present invention describes a method and an apparatus for use in building a health check request having any desired format in order to determine a state of a resource in a network environment. A health check request built in accordance with the present invention is considered a "raw" or "binary" health check request for it contains hexadecimal data in a format understandable by the network resource. A health check request of the present invention supports any communication protocol including proprietary protocols. This allows a requester to determine a state of a network resource such as, but not limited to, an application, a database, or a network device communicating in a vendor specific protocol. Furthermore, the methods and apparatus of the illustrative embodiment allow a user to define a health check request and to define an expected response to the health check request from the remote resource. The methods and apparatus of the illustrative embodiment of the present invention beneficially allow a requestor to build a health check request without having programming knowledge of the protocol format supported by a network resource and determine an operational state of the network resource with the health check request. This can be performed by capturing a request and a response of a successful transaction with the network resource using a capture mechanism such as, a sniffer, a protocol analyzer, or other like mechanism.

Figure 1:
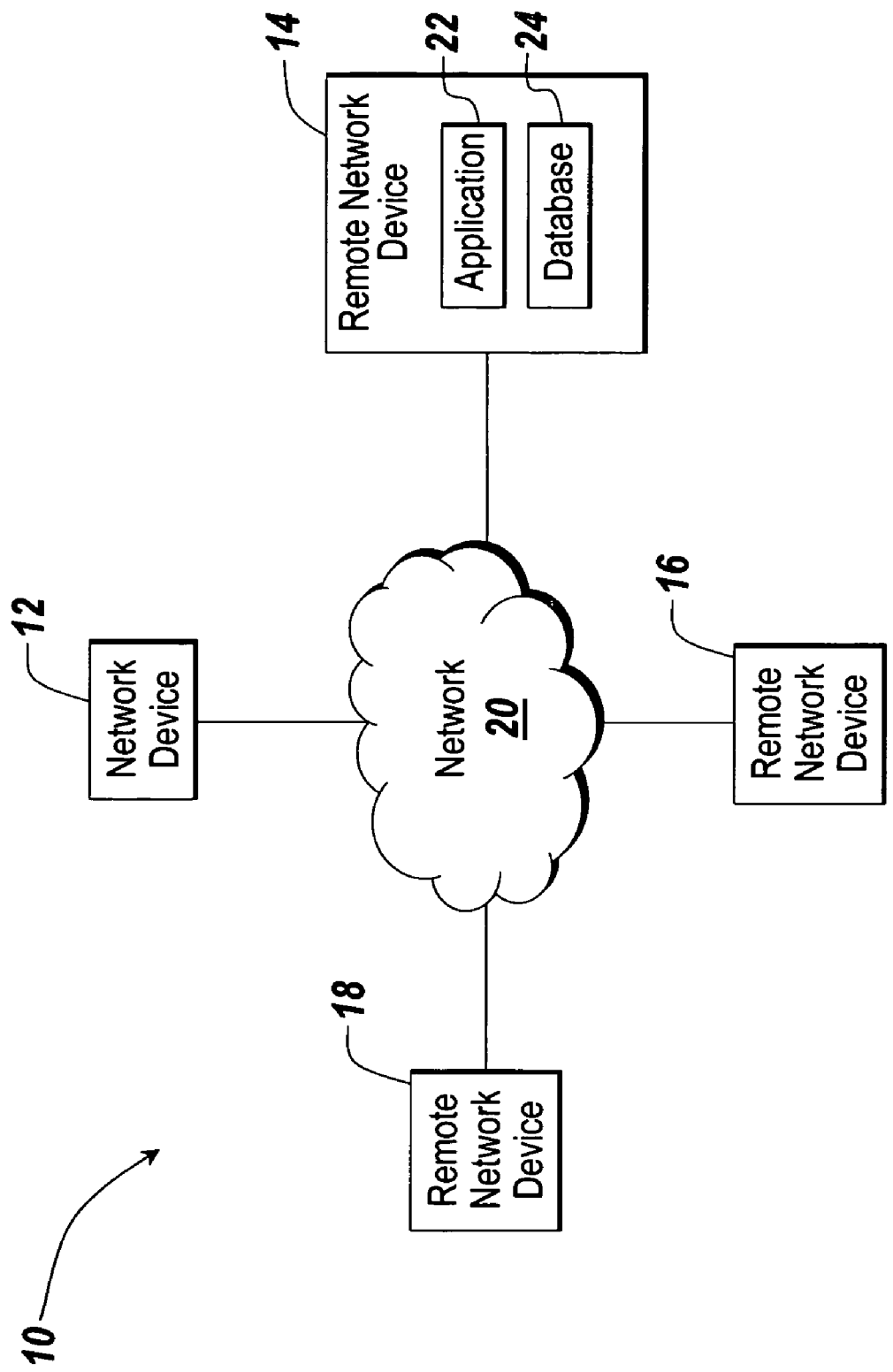
FIG. 1 is an exemplary block diagram illustrating an environment suitable for practicing the illustrative embodiment of the present invention.

FIG. 1 illustrates an exemplary network environment suitable for practicing the illustrative embodiment of the present invention. Network environment 10 includes network device 12, remote network device 14, remote network device 16, remote network device 18, and network 20. Network device 12, remote network device 14, remote network device 16, and remote network device 18 are capable of communicating with each other via network 20 in a suitable communication protocol. Network 20 can be the Internet, an intranet, a LAN, a WAN, or other suitable network either wired, wireless or a hybrid of wired and wireless. Remote network device 14 includes application 22 and database 24 amongst other resources available to each network device associated with network 20.

Before continuing with the discussion below it is helpful to first define a few terms as used herein.

The term "network device", refers to an electronic device or apparatus configured for use in a network environment as able to understand and perform operations with data according to a data communication protocol.

The term "capture mechanism" refers to a program or a device capable of capturing data traveling over a network.

Figure 2:
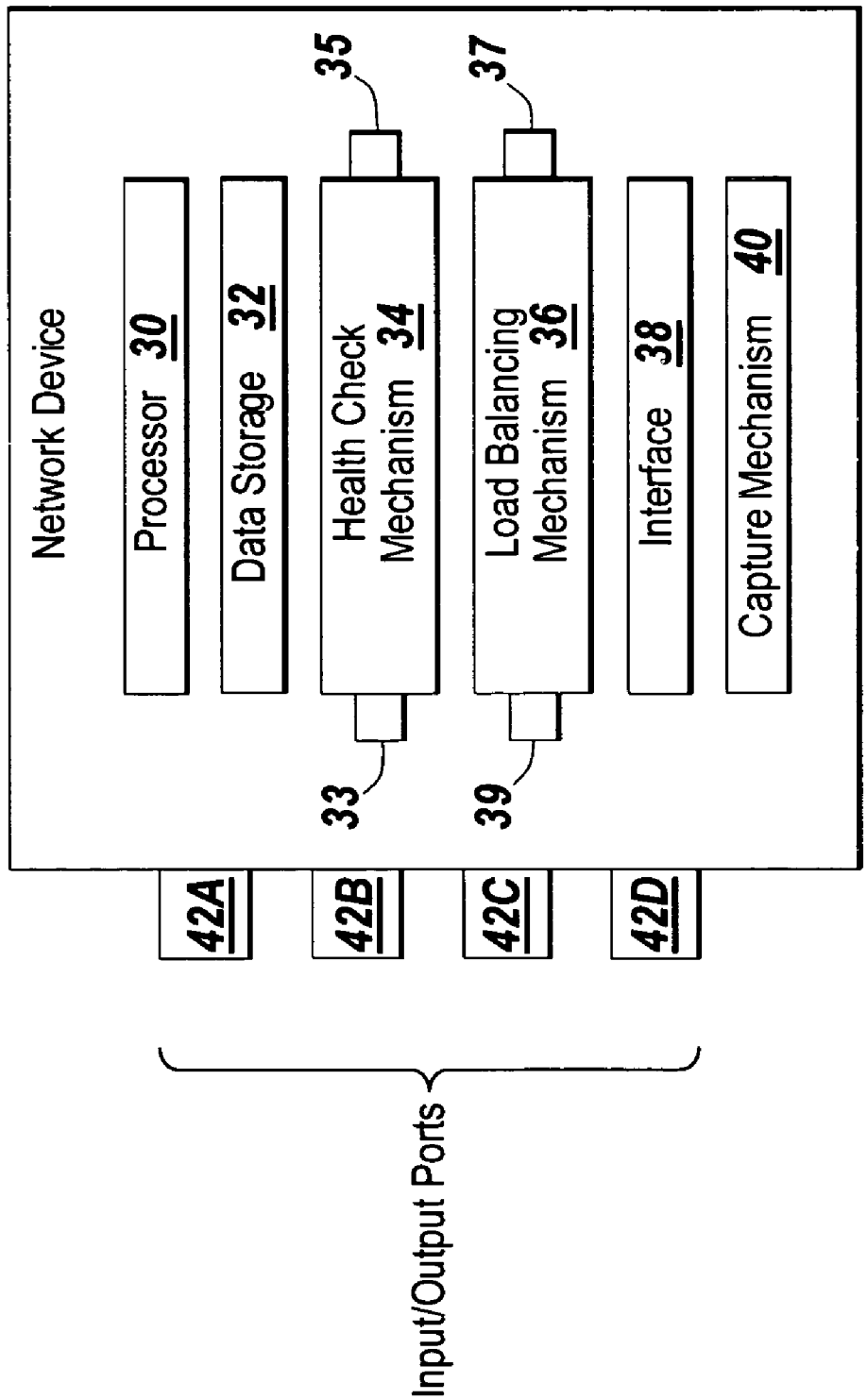
FIG. 2 is an exemplary block diagram of a network device suitable for practicing the illustrative embodiment of the present invention.

FIG. 2 illustrates network device 12 in more detail. Network device 12 includes processor 30, data storage device 32, health check mechanism 34, load balancing mechanism 36, interface 38, capture mechanism 40, input/output ports 42A-42D. Processor 30 is configured to execute various instructions and programs, and control various hardware and software components such as network interface cards (NICs) associated with input/output ports 42A-42D. Data storage device 32 provides storage for one or more executable programs, such as one or more OS programs and various other program applications developed in a variety of programming environments for controlling device software and hardware components. Data storage device 32 can further hold data collected by the capture mechanism 40.

Those skilled in the art will appreciate that the input/output ports network device 12 are configurable as discrete input ports for receiving network traffic and discrete output ports for transmitting network traffic so as to couple to a transmission medium having a single primary conductor for carrying network traffic in one direction. Moreover, those skilled in the art will recognize that input/output ports 42A-42D each couple to a transmission medium having at least two primary conductors, with at least one primary conductor carrying network traffic in a first direction and at least one primary conductor carrying network traffic in a second direction. Furthermore, those skilled in the art will appreciate that network device 12 is configurable to support power over Ethernet (POE).

Health check mechanism 34 includes an input 33 and an output 35. The health check mechanism 34 provides a build tool responsive to requests received on input 33 via interface 38 to build or generate a health check request containing "raw" or "binary" data having a desired data format specified by the requestor. Health check mechanism 34 can also output a signal on output 35 to load balancing mechanism 36. The signal provides load balancing mechanism 36 with information for use in determining a suitable load balancing scheme in the network environment. Load balancing mechanism 36 includes an input port 37 to receive the output signal from health check mechanism 34. Load balancing mechanism 36 can be configured to be responsive to the output of the health check mechanism 34 to load balance network traffic across remote network devices 14, 16, and 18. In this manner, load mechanism 36 can weigh the health or state of one or more of remote network devices 14, 16, and 18, when determining how to balance network traffic directed towards one or more of the remote network devices or remote resources.

Interface 38 is an interface accessible to a requestor either directly via network device 12, for example a console, or indirectly via a network management station (not shown) to receive one or more requests to build a health care request. Interface 38 can also receive from the requester, one or more requests to define the format of a response from a remote network device or a remote resource such as, application 22 or database 24. Interface 38 is configurable as a command line interface (CLI), a graphical user interface (GUI), or a menu driven interface.

Capture mechanism 40 is configurable to capture a unit of network traffic on input/output ports 42A-42D or on any transport medium connected to the input/output ports 42A-42D. Capture mechanism 40 is configurable to capture the unit of network traffic automatically or in response to a request from a requestor. Capture mechanism 40 can provide at least a portion of the captured unit of network traffic to the health check mechanism 34 for use in building a health check request. Capture mechanism 40 can be configured to identify which unit of network traffic to capture. That is, capture mechanism 40 can examine a unit of the network traffic to determine if the unit identifies the remote network device or remote resource of concern. In this manner, health check mechanism 34 can build a health check request using data in a format understandable by the remote network device or remote resource, because capture mechanism 40 can capture a unit of network traffic containing data in the format understandable by the remote network device and provide a portion of the data to the health check mechanism 40 for use in building the health check request. This benefits a network administrator operating a proprietary application on a remote device for the health check mechanism 34 can build a health check request in a format understood by the remote application having a proprietary protocol without the network administrator having any programming knowledge of the proprietary protocol.

Figure 3:
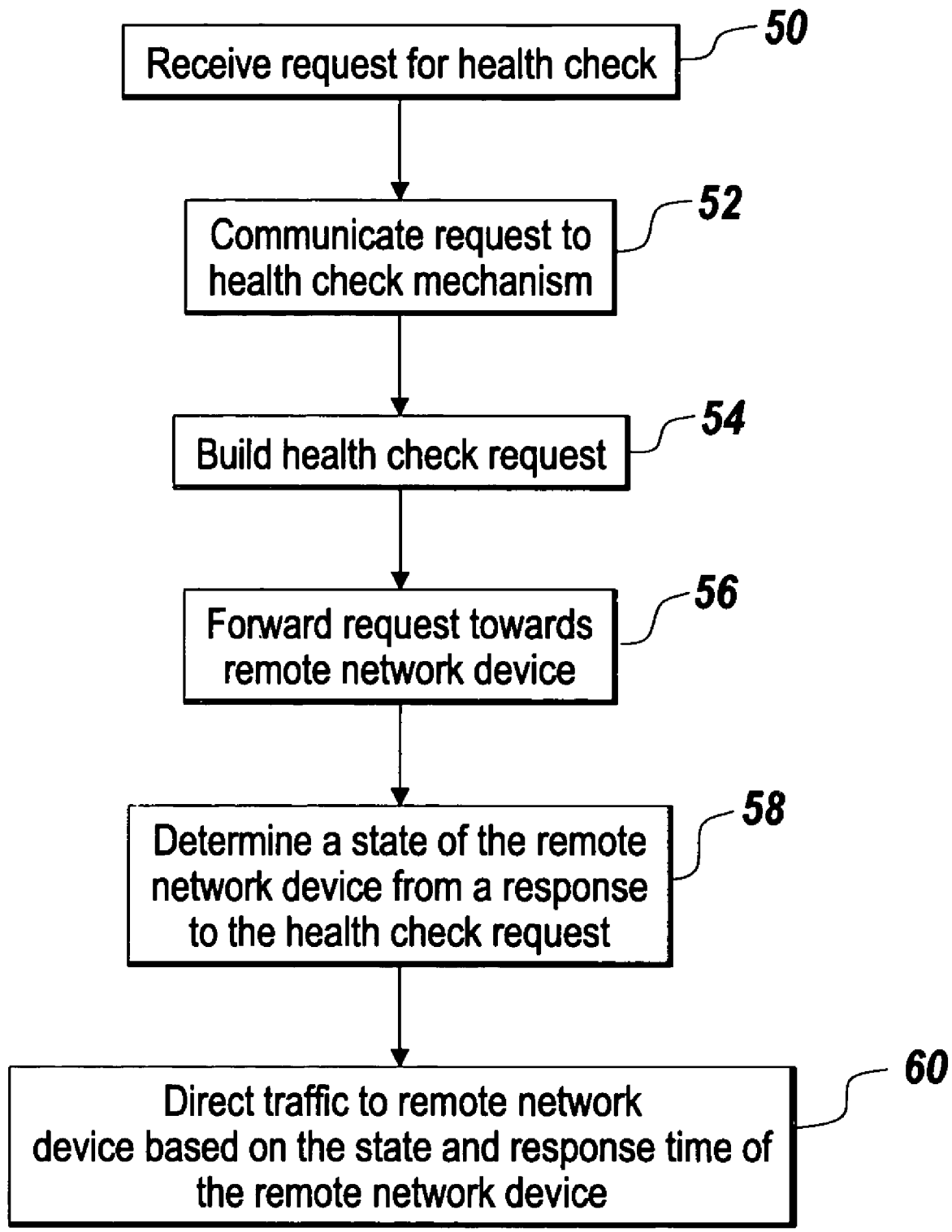
FIG. 3 is a block flow diagram illustrating steps taken to practice the illustrative embodiment of the present invention.

FIG. 3 illustrates steps taken by the illustrative embodiment of the present invention to build a health check request. FIG. 3 is discussed in connection with FIG. 2.

In step 50, network device 12 via interface 38 receives a request for building a health check request. The request received via interface 38 can also define a data format for a suitable response to the built health check request. In step 52, interface 38 forwards the request for building the health check request to the health check mechanism 34. In step 54, health check mechanism 34 builds the health check request as defined by the request received via interface 38. Health check mechanism 34 can build the health check request by using data provided as part of the request received from the requestor via interface 38. The data provided by the requestor via interface 38 has a hexadecimal format of a protocol understandable by the remote network device or remote resource of concern. In the alternative, if the requestor does not provide as part of the request for building the health check request the hexadecimal data for use in building the health check response, the requestor can request capture mechanism 40 via interface 38 to capture an appropriate unit of network traffic, and in turn, capture mechanism 40 can provide health check mechanism 34 with at least a portion of the captured unit for use in building the health check request. Further, the requestor via interface 38 can instruct the health check mechanism 34 to retrieve the hexadecimal data for use in building the health check request from one or more locations in the data storage device 32.

Those skilled in the art will appreciate that health check mechanism 34 can build a health check request for use with a connection-oriented protocol such as transmission control protocol (TCP) or with a connection-less oriented protocol such as user datagram protocol (UDP). In step 56, health check mechanism 34 forwards the built health check request towards the remote network device or the remote resource. In step 58, network device 12 determines a state and/or a response time of the remote network device from a response to the health check request. In step 60, load balancing mechanism 36 directs traffic to the remote network device or the remote resource based on the state and/or the response time of the remote network device or remote resource determined from the response received to the health check request.

To facilitate illustration of the generation or building of a health check request in accordance with the present invention several examples are discussed in detail below. Those skilled in the art will recognize that the health check requests built in accordance with the present invention beneficially support multiple levels of functionality in order to verify a network device or resource performs multiple state transitions as expected. Each state transaction can have either a response, a request, or both a response and request associated with it. This allows a requestor to verify or test multiple aspects of an application protocol and validate the responses returned from the remote resource.

A further benefit provided by the present invention is the ability of a requestor to define a response to a health check request. That is, the requestor can define a response to have a specific format or a general non-specific format depending on the features of the remote network device or remote network resource the requestor is trying to verify. As such, health check requests built or generated in accordance with the present invention support a variety of requests ranging from fundamental handshakes to the verification that a remote network device or remote network resource of concern transitions to a desired state when a particular event occurs.

A health check request built by the health check mechanism 34 can include one, two, or four byte transaction IDs used to identify sessions, message counters, and other like features. In addition, a requestor via interface 38 can define a response format for a health check request by defining an acceptable response that includes one or more symbols such as, wildcard symbols representing one or more bits in the response that are "match any" bits or "don't care" bits. In this manner, the ability of a requestor to define one or more locations in a response using such symbols allows the requestor to account for data such as, dynamic data within a data stream while ensuring error codes and session IDs are properly set in the response.

Table 1 illustrates an exemplary data set for use by the health check mechanism 34 in building a health check request in accordance with the present invention. A health check request built according to the data set depicted in Table 1 uses data captured by the capture mechanism 40 from a unit of network traffic to provide a valid request. The data format of the captured data conforms to the terminal access controller access control system (TACACS) authentication protocol. The TACACS protocol typically is not supported by pre-defined health check requests. Nevertheless, in accordance with the present invention, the health check mechanism 34 in conjunction with the capture mechanism 40 can build a health check request using binary data to determine an operational state of a remote network device or resource.

The health check request built according to the data set depicted in Table 1 is sent towards the remote network device or resource of concern in accordance with the TCP protocol. The request string identifies a data stream captured by the capture mechanism 40. The captured data stream represents an encrypted TACACS packet. The health check request further defines an acceptable response to health check request as "any response", since any response indicates that the request was received and understood by the remote network device. One purpose of the health check requested depicted in Table 1 is to verify that the remote network resource is responsive, not that the user associated with the captured data was authenticated properly. The health check request depicted in Table 1 further defines a time interval for attempting a retry, the number of retries that should be attempted, a success rate, the number of time outs that occurred waiting for a response from the remote resource, and a failure count.

TABLE 1

| Name: | Hc1 |
|---|---|
| Type: | RAW_TCP |
| Profile Description: | A raw TACACS stream for user: davidc, password:whocares,secret:my-dirty-little-secret |
| Interval: | 5 |
| Retries: | 3 |
| Success Rate: | 0 |
| Timeout: | 2 |
| Count: | 3 |
| RAW Mode: | anyResponse |
| Request String: | C1010100cb5c64f0000000a4cba8983571909830dcd5aa acddd847690a45d874c02be1ee28b |

Table 2 depicts another exemplary data set suitable for use in instructing health check mechanism 34 to build a health check request having a transaction ID of two bytes representable by the symbols "####" and binary data in a hexadecimal format supported by the domain name system (DNS) over the UDP protocol. The data set depicted in Table 2 illustrates the use of a transaction ID in a health check request for use in verifying a transaction ID of an expected response. Those skilled in the art will appreciate that the health check requests of the present invention are capable of representing a one byte transaction ID as "##", a two byte transaction ID as "####", and a four byte transaction ID as "########". Likewise, the health check requests of the present invention are capable of representing one byte of "don't care" or "match any" data as "??" and two bytes of "don't care" or "match any" data as "????". The data depicted in Table 2 exemplifies a domain name system DNS exchange using "####" symbols for a transaction ID in the request string and "####" symbols in an expected response string having a matching transaction ID. The health check request built in accordance with the data depicted in Table 2 illustrates the use of a transaction identifier used by DNS to identify matching requests and responses. The transaction ID symbol "####" represents a two byte hexadecimal digit transaction ID incremented by one for each new transaction. As such, validation of the response of the DNS server to the health check request configured in accordance with Table 2 requires the received transaction ID to match the transaction ID of the health check request.

TABLE 2

| Name: | Hc1 |
|---|---|
| Type: | RAW_UDP |
| Profile Description: | A DNS/UDP probe for host isi.edu, specific response, with transactionID |
| Interval: | 5 |
| Retries: | 3 |
| Success Rate: | 0 |
| Timeout: | 2 |
| Count: | 3 |
| RAW Mode: | specificResponse |
| Request String: | ####0100000100000000000003697369036564750000010001 |
| Response String: | #### |

Table 3 illustrates a further exemplary data set suitable for configuring a health check request suitable for use with TCP protocol. The health check request built using the data in Table 3 includes "don't care" symbols "????" in the response string to indicate that the length of the expected response does not matter. However, the requestor has defined that the transaction ID of the expected response should match the transaction ID of the health check request as represented by the symbols "####" in the response string. The expected response to the health check request built using the data in Table 3 has an overall length considered not important because each network device can return a different number of attributes in response to the request string of the health check request. Nevertheless, in this example, it is desirable to verify the transaction ID to ensure the remote network device or resource responds properly to the health check request. The use of the "don't care" symbols "????" in the expected response string ignore the response length field, which is two bytes long. Nonetheless, the expected transaction ID "####" must match the initial request.

TABLE 3

| Name: | Hc2 |
|---|---|
| Type: | RAW_TCP |
| Profile Description: | A DNS/TCP probe for host isi.edu, specificresponse, wildcard tcp-len, and transID |
| Interval: | 5 |

TABLE 3-continued

| | |
|---|---|
| Retries: | 3 |
| Success Rate: | 0 |
| Timeout: | 2 |
| Count: | 3 |
| RAW Mode: | specificResponse |
| Request String: | 0019####0100000100000000000036973690365647500000010001 |
| Response String: | ????#### |

Table 4 below illustrates an exemplary data set for use in building another health check request in accordance with the present invention. The data sets depicted in Table 4 demonstrates a single state transaction capability of a health check request of the present invention. Tables 4-6 illustrate use of health check requests in accordance with the present invention in an environment that includes an email server running simple mail transfer protocol (SMTP) over TCP. Under normal operating conditions, the email server expects to accept TCP connections from a requester, and, in turn, the email server announces itself to the connected resource before accepting data, or any commands.

Table 4 illustrates exemplary data for use in building a health check request that issues a single command to the email server and as long as the server responds, that is, the email server announces itself, the server is considered to be operational.

TABLE 4

| | |
|---|---|
| Name: | Hc1 |
| Type: | RAW_TCP |
| Profile Description: | An SMTP/TCP probe doing a simple HELO david\r\n' then disconnecting. Expects announcement from server. |
| Interval: | 5 |
| Retries: | 3 |
| Success Rate: | 0 |
| Timeout: | 2 |
| Count: | 3 |
| RAW Mode: | anyResponse |
| Request String: | 68656c6f2064617669640d0a |
| Response String: | |

Table 5 illustrates an exemplary data set for use in building a second health check request to the email server. The data set depicted in Table 5 demonstrates the multiple state transaction capability of a health check request of the present invention. The health check request built using the exemplary data of Table 5 demonstrates three state transitions, each of which require a specific response from the email server. Before any health check requests are forwarded to the email server, the email server is allowed to announce itself. Once the email server has announced itself health check mechanism 34 issues a "hello" health check request and the response from the email server is verified. Following the verification of the response from the email server, the health check mechanism 34 issues a "quit" health check request to end the session and verify the response of the email server. The sequence of having the email server announce itself, respond to a "hello" command, and respond to a "quit" command illustrates a multiple state transition conducted by the email server and the ability of the health check request mechanism 34 of the present invention to verify a successful multiple state transition by a remote network device or resource.

TABLE 5

| | |
|---|---|
| Name: | hc2 |
| Type: | RAW_TCP |
| Profile Description: | An SMTP/TCP probe doing a Stateful REQ: 1-NoOp, 2-simple HELO david\r\n", 3-QUIT, RSP: 1-220 greeting, 2-250 OK, 3-221 closing connection |
| Interval: | 5 |
| Retries: | 3 |
| Success Rate: | 0 |
| Timeout: | 2 |
| Count: | 3 |
| RAW Mode: | specificResponse |
| Request String: | { } {68656c6f2064617669640d0a}{515549540d0a} |
| Response String: | {323230}{323530}{323231} |

Table 6 illustrates a data set suitable for use in building a health check request in accordance with the present invention that demonstrates similar multiple state transitions as described above in connection with Table 5. Table 6 illustrates the addition of a "from" and "to" command. The addition of the "from" and "to" command emulates a client operation of sending a message to the email server. The expected response string from the email server to the health check request built in accordance with the data set depicted in Table 6 includes "don't care" symbols "??????" to account for a pool of servers responding with either a "250 OK" or a "550 relay" which are both appropriate codes depending on how the email server is configured.

TABLE 6

| | |
|---|---|
| Name: | hc3 |
| Type: | RAW_TCP |
| Profile Description: | An SMTP/TCP probe doing a Stateful! REQ: 1-NoOp, 2-mail from: N@LA\r\n', 3-RCPT to dchoiniere@PDQ.com, 4-QUIT, RSP: 1-220 greating, 2-250 OK, 3-250 OK or 550 relay, 4-221 closing connection |
| Interval: | 5 |
| Retries: | 3 |
| Success Rate: | 0 |
| Timeout: | 2 |
| Count: | 3 |
| RAW Mode: | specificResponse |
| Request String: | { }{4d41494c2066726f6d3a204e404c410d0a}{52435 05420746f3a206463686f696e69657265406e6175746963 75736e65742e636f6d0d0a}{515549540d0a} |
| Response String: | {323230}{323530}{??????}{323231} |

While the present invention has been described with reference to an illustrative embodiment thereof, one skilled in the art will appreciate that there are changes in form and detail that may be made without departing from the intended scope of the present invention as defined in the pending claims. For example, the load balancing mechanism in response to an output from the health check mechanism can load balance network traffic across a number of servers from an array of servers. As such, servers in the array considered to have undesirable operational characteristics based on one or more responses to a health check request are removed and the load balancing mechanism balances network traffic to the remaining operational servers. Moreover, the health check mechanism is adaptable and configurable to log the results of a health check request in a data structure held by data storage mechanism 32. In this manner, a network administrator can readily display health information on one or more remote network devices or resources.

What is claimed is:

1. A network health check system comprising:
    a health check mechanism having an input to receive a request to build a health check request for a remote network device and to configure an expected response to the health check request from the remote network device, wherein the health check mechanism receives the request and conducts a binary health check by sending a binary request string and then checking for the expected response;
    a capture mechanism configured to capture a unit of network traffic from a transport medium identifying the remote network device as a destination, the health check mechanism using at least a portion of the captured unit in conducting the binary health check; and
    wherein the expected response is of a particular format determined by features of the remote network device as detected by the health check mechanism.

2. The network health check system of claim 1 further comprising: a load balancing mechanism having an input to receive an output of the health check mechanism and in response to the output, determine an amount of network traffic to direct towards the remote network device.

3. The network health check system of claim 1, further comprising: an interface to receive the request.

4. The network health check system of claim 1, wherein the health check mechanism builds the health check request to include data in a hexadecimal format.

5. The network health check system of claim 1, wherein the health check mechanism builds the health check request to include a session ID.

6. The network health check system of claim 1, wherein the health check mechanism builds the health check request to include a transaction ID.

7. The network health check system of claim 1, wherein the health check mechanism builds the health check request to include one or more symbols to indicate one or more bits in response to the health check are don't care bits.

8. The network health check system of claim 1, wherein the health check mechanism builds the health check request to include one or more symbols to indicate one or more bits in response to the health check are match any bits.

9. The network health check system of claim 1, wherein receipt of the health check request by the remote network device causes the remote network device to transition from a first state to a second state to indicate an operational capability of the remote network device.

10. The network health check system of claim 1 wherein the expected response is configured by the health check mechanism such that the expected response is based upon a configuration of the remote network device.

11. The network health check system of claim 6 wherein the expected response is configured by the health check mechanism such that the expected response includes the transaction ID received within the health check request.

* * * * *

UNITED STATES PATENT AND TRADEMARK OFFICE
CERTIFICATE OF CORRECTION

PATENT NO.       : 7,577,101 B1  
APPLICATION NO.  : 10/835795  
DATED            : August 18, 2009  
INVENTOR(S)      : Choiniere et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1155 days.

Signed and Sealed this

Seventh Day of September, 2010

David J. Kappos  
*Director of the United States Patent and Trademark Office*